Aug. 6, 1968 W. FISHER 3,395,956
QUICK DETACHABLE MOUNTING FOR BEARING RACES
Filed Nov. 1, 1966 2 Sheets-Sheet 1

WALTER FISHER
INVENTOR

BY *Mason, Porter, Diller & Stewart*
ATTORNEYS

Aug. 6, 1968 W. FISHER 3,395,956
QUICK DETACHABLE MOUNTING FOR BEARING RACES
Filed Nov. 1, 1966 2 Sheets-Sheet 2
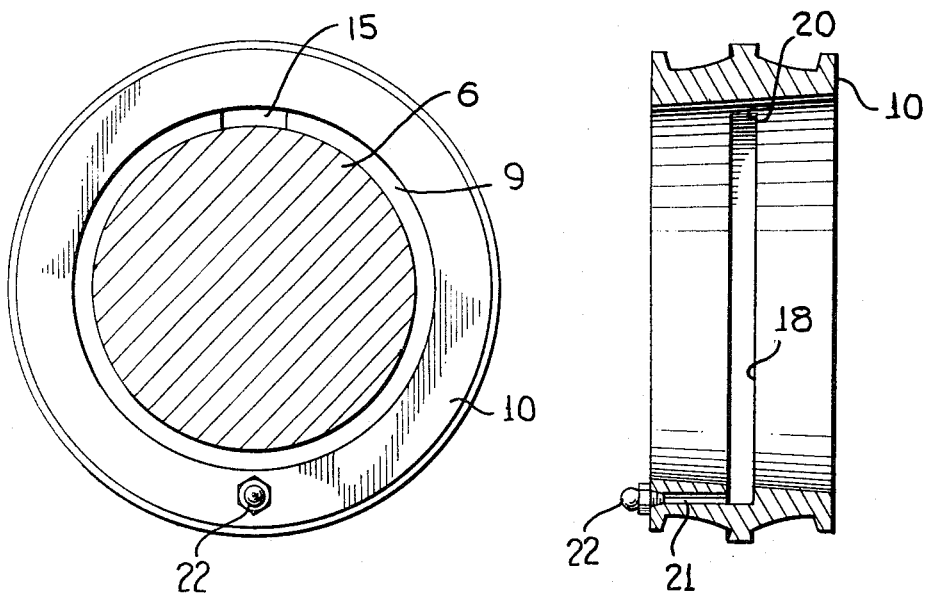
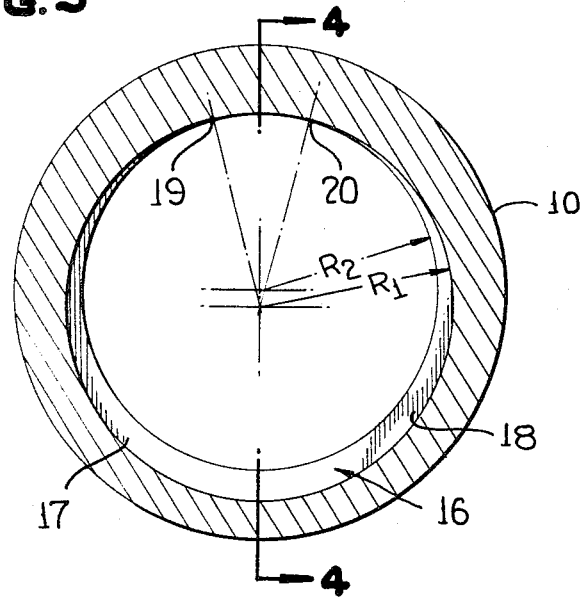
INVENTOR
WALTER FISHER

United States Patent Office 3,395,956
Patented Aug. 6, 1968

3,395,956
QUICK DETACHABLE MOUNTING FOR BEARING RACES
Walter Fisher, South Bend, Ind., assignor to The Torrington Company, Torrington, Conn., a corporation of Maine
Continuation-in-part of application Ser. No. 281,210, May 17, 1963. This application Nov. 1, 1966, Ser. No. 600,318
14 Claims. (Cl. 308—236)

ABSTRACT OF THE DISCLOSURE

This invention is directed to providing a bearing inner ring, having a peripheral groove on the inner surface thereof, which is adapted to facilitate removal of the ring from either a tapered sleeve on a shaft, or from a tapered shaft. The removal groove is eccentrically machined in the ring, to have a point of greatest depth and extends about the inner periphery of the ring, diminishing in depth toward closed ends of the groove, leaving an uncut portion of the ring between closed ends of the groove. This uncut portion facilitates the use of the ring with a tapered sleeve, having a longitudinal slot, such that when a ring is used in conjunction with a split sleeve, the slot in the sleeve communicates with the uncut portion of the inner ring surface, and the removal groove of the ring is not in communication with the slot of the sleeve. A principal advantage of the invention is that the removal groove may be machined in the ring by a simple rotating cutting tool, but yet is discontinuous about the periphery of the ring.

---

This application is a continuation-in-part of application Ser. No. 281,210, filed May 17, 1963, now abandoned.

The following specification relates to a quick, detachable mounting for rolling bearing rings, particularly the inner rings of roller or ball bearing units when used with a tapered shaft or a shaft having a tapered sleeve.

Roller bearings, especially those of the self-aligning type, can be fitted on a shaft having a solid uninterrupted surface subject, however, to the problem that there is frequent difficulty in loosening the ring from the shaft incidental to its removal. This removal is usually accomplished by providing a peripheral groove on the shaft surface under the ring. This groove is then supplied with fluid under high pressure resulting in sufficient separation of the ring from the shaft to permit the ring to be removed readily.

However, in some instances there is a tendency toward loss of the pressure fluid between the mating surfaces without effecting their separation. This is especially true where the self-aligning spherical roller bearing has an inner ring with a tapered inner surface. It is customary to mount such a ring with its tapered inner surface on a tapered shaft or if the shaft is cylindrical, then upon a tapered sleeve which serves to adapt the inner ring to the shaft.

Such tapered sleeves are split longitudinally so that they may be compressed or clamped on the shafts by the operation of installing the tapered inner ring.

The opening of the tapered sleeve between the edges where the split occurs, cannot be filled with a shim or wedge. The pressure fluid in the peripheral groove of the race is subject to loss through the slot.

The present invention is addressed to overcoming this problem by giving the peripheral groove of the ring a special form. Thus the groove is discontinuous. In other words, it does not extend over that radial portion of the sleeve which may be open over the slot. The cross sectional area of the groove in the sleeve is also given varying depth so that it diminishes in distance toward the closed ends of the groove. In this way, high pressure fluid is supplied over a controlled localized periphery of the sleeve or shaft to effect separation without leakage of the fluid through the slot in the sleeve.

Prior art bearing devices using removal grooves are often very difficult to machine, generally requiring a milling operation, and resulting in a removal groove of constant depth about that portion of the circumference of the member about which the groove is cut. Such prior art devices are disadvantageous, in that milling operations and the like are relatively expensive and difficult to set up, thus rendering the product to be economically impractical from the standpoint of competitive production.

An object of the invention is to facilitate the removal of the inner ring of a roller or ball bearing from a tapered shaft or sleeve.

A further object of the invention is to prevent loss of pressure fluid from the mating surfaces of the ring and the split sleeve on which it is mounted.

Another object of this invention is to provide a bearing ring and split sleeve combination, wherein the bearing ring has a novel removal groove, the ends of which terminate out of communication with the split in the split ring, thereby preventing loss of removal fluid through the split in the split ring.

Yet another object of this invention is to provide a novel ring member having an annular removal groove therein, extending incompletely of a circumference of the ring, and which may be cut into the ring by economically feasible maching operations.

Another object of this invention is to provide a novel bearing ring, having an annular removal groove therein, wherein the depth of the groove continuously diminishes from a point of greatest depth toward its ends.

A further object of this invention is to provide a novel bearing ring having a removal groove therein which is eccentrically cut into a circumferential surface of the ring, by a continuously rotating cutting tool, leaving a portion of the cut surface of the ring opposite the point of greatest groove depth in an uncut condition.

A still further object of the invention is to localize the pressure of the fluid variable over the periphery of the sleeve and thus increase the effective separating pressure.

Further objects of the invention will be apparent from the following description of the preferred form as illustrated in the accompanying drawings in which:

FIGURE 2 is a transverse section of a shaft equipped with the improved bearing ring;

FIGURE 3 is a median transverse section of the bearing ring and

FIGURE 4 is a section of the bearing ring taken on the line 4—4 on FIGURE 3.

Figure 1:
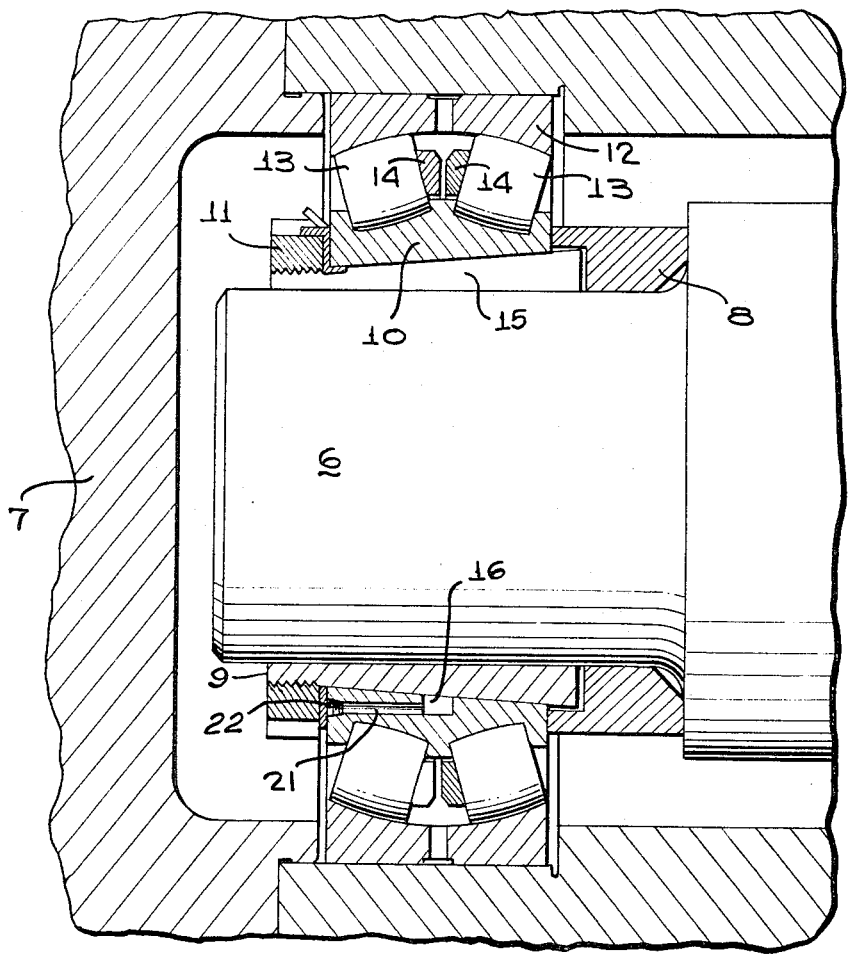
FIGURE 1 is a fragmentary side view partly in section of a mill roll in which the improved mounting has been installed.

It is to be understood that the split sleeve permits ready mounting upon a cylindrical shaft, and then the sleeve is tightly clamped due to the axial movement of the inner ring of the bearing on the tapered surface of the sleeve. The resulting attachment is sufficiently strong to prevent ready removal of the inner ring by means of internal pressure except with considerable loss of hydraulic pressure fluid escaping through the longitudinal slot of the tapered sleeve. By cutting the groove in the bore of the ring, eccentric to the axis of the latter, a certain portion of the bore will be completely uninterrupted. This portion of the ring if set over the slot in the sleeve, prevents the escape of the hydraulic pressure fluid.

In the drawings, the improved inner ring of the raceway is mounted upon a cylindrical rotary shaft 6. This shaft is shown as the neck of a mill roll in a housing 7. An inner spacing ring 8 is provided between the shoulder of the shaft and the inner end of a tapered sleeve 9. The sleeve is split and carries an inner ring 10, clamped in place by retaining ring 11. The inner ring 10 has raceway grooves on the outer surface thereof.

An opposite outer ring 12 is provided in the housing 7. Between the rings 10 and 12 are two series of spherical rollers 13, 13 with suitable retainers 14, 14.

Since the self-aligning spherical bearing involves the use of a tapered or conical inner ring, a correspondingly tapered sleeve 9 is first fitted over the shaft 6. The sleeve is split lengthwise to provide an open slot 15. The inner ring 10 of the bearing is formed with a taper corresponding to that on the sleeve 9. The ring is fitted over the sleeve and driven lengthwise of the shaft until the sleeve is compressed into a fixed position. This leaves the open slot 15 on one point of the periphery of the sleeve.

The ring 10 has an eccentric groove 16 cut therein, as by offsetting the ring with respect to a rotating cutting tool of a lathe. This groove is of diminishing depth measured from its center. It thus has branches 17 and 18 which do not, however, meet but have continuously diminishing closed ends 19 and 20 which terminate in longitudinally disposed lines, caused by the merger of the diameter of the inner surface of the eccentrically offset groove 16 with the diameter of the bore of the ring 10, as is best illustrated in FIGURE 3. The distance between the ends of the branches 17 and 18 which terminate in lines 19 and 20 is greater than the width of the slot 15.

Referring to FIGURE 3 of the drawings, the radius R1 of the eccentrically offset groove or channel 16 is illustrated as extending from an axis which is downwardly offset from the axis of the ring bore having radius R2.

In mounting the ring on the sleeve, the part of the circumference of the ring 10 lying between the points 19 and 20 is fitted over the slot 15 of the sleeve. By driving the ring axially on the shaft, the ends of the slot 15 are constricted but under all conditions lie between the ends 19 and 20.

At the mid-point of the groove 16 where its depth is greatest, it is provided with a laterally extending duct 21. Where this duct reaches the side wall of the ring 10, it is provided with a screw threaded nipple or other fitting 22, by which pressure fluid may be supplied.

Application of pressure fluid through the duct 21 delivers the fluid into the two branches 17 and 18 of the groove 16. The close fitting of the ring over the groove 16 prevents escape of the pressure fluid at this point. Pressure fluid applied through branches 17 and 18 penetrates between the mating walls of the sleeve and ring. Thus the ring is loosened and may be easily driven off of the sleeve.

It will be apparent that by means of the above novel arrangement, a quick detachable mounting is provided for inner bearing rings on a tapered sleeve. The invention may be embodied in structures varying from the above in minor details of material and proportions within the scope of the following claims.

I claim:
1. A bearing ring comprising outer and inner peripheral surfaces and an incomplete peripheral channel of a length substantially greater than 180 degrees about its peripheral surface on one of the surfaces, the depth of the channel continuously diminishing toward its ends from a point of greatest depth intermediate its ends.

2. The bearing ring of claim 1 wherein said channel is cut on the inner peripheral surface of the ring.

3. The bearing ring of claim 2 wherein the ring has at least one complete annular raceway groove for rolling elements on the outer surface thereof.

4. The bearing ring of claim 3 wherein the channel is eccentrically circularly cut such that a longitudinal axis of said channel is spaced from the longitudinal axis of the ring.

5. The bearing ring of claim 4 wherein said axes are diametrically aligned between an uncut surface portion intermediate channel ends and the point of greatest channel depth.

6. The bearing ring of claim 5 wherein the inner peripheral surface of the ring comprises a tapered bore.

7. The bearing ring of claim 5 wherein means are provided for introducing fluid pressure into the channel intermediate the channel ends.

8. The bearing ring of claim 5 wherein there is provided a transverse duct in the race connecting with the channel at its deepest point and an inlet fixture on the outer end of the duct.

9. In combination, a tapered sleeve adapted to be mounted on a shaft or the like, said sleeve having spaced edges defining a longitudinal slot therebetween to permit constriction on the shaft, an inner ring positioned on the sleeve having the same taper as a mating surface of the sleeve, said ring having on an inner surface a peripheral channel with closed ends more widely spaced across the slot than the distance between the edges of the sleeve, and means for introducing pressure fluid into said channel.

10. The combination of claim 9 wherein said means for introducing pressure fluid into said channel is at the channel midpoint; and wherein said ring includes a bearing raceway on an outer surface.

11. The combination of claim 9 wherein the depth of the channel continuously diminishes from a point of greatest depth toward its end.

12. In combination, a tapered sleeve adapted to be mounted on a shaft or the like, said sleeve having spaced edges defining a longitudinal slot therebetween to permit constriction on the shaft, an inner ring positioned on the sleeve having the same taper as a mating surface of the sleeve, said ring having on an inner surface a peripheral channel with closed ends of the channel each adjacent a respective edge of the sleeve and more widely spaced than a distance between the edges of the sleeve, and means for introducing pressure fluid into the channel.

13. The combination of claim 12, wherein the depth of the channel continuously diminishes from a point of greatest depth toward its ends.

14. In a bearing assembly, a first ring in generally concentric engagement with a second ring, said first ring comprising outer and inner peripheral surfaces and means for receiving removal fluid and facilitating the removal of the first ring from the second ring, said means comprising an incomplete peripheral channel on one of the surfaces of said first ring and of a length substantially greater than 180 degrees, the depth of the channel continuously diminishing toward its ends from a point of greatest depth intermediate its ends and a laterally extending duct opening through an end of the ring and opening into said channel at its greatest depth; wherein the channel is eccentrically circularly cut such that a longitudinal axis of the channel is spaced from the longitudinal axis of the ring.

References Cited

UNITED STATES PATENTS

| | | | |
|---|---|---|---|
| 2,226,524 | 12/1940 | Runge et al. | 308—236 |
| 2,131,170 | 9/1938 | Evans | 308—122 |
| 2,564,670 | 8/1951 | Bratt | 308—236 |
| 2,884,282 | 7/1959 | Sixsmith | 308—122 |
| 2,840,399 | 6/1958 | Harless et al. | 308—236 |
| 3,011,838 | 12/1961 | Love | 308—122 |

MARTIN P. SCHWADRON, *Primary Examiner.*

FRANK SUSKO, *Assistant Examiner.*